Nov. 19, 1957 E. SCHROTER 2,813,686

MAGNETIC RECORDING APPARATUS

Filed May 8, 1952

6 Sheets-Sheet 1

Inventor
E. Schroter
By Fetherstonhaugh & Co
Attorneys

Nov. 19, 1957

E. SCHROTER 2,813,686

MAGNETIC RECORDING APPARATUS

Filed May 8, 1952

6 Sheets-Sheet 2

Inventor
E. Schroter
By Fetherstonhaugh & Co.
Attorneys

Nov. 19, 1957 E. SCHROTER 2,813,686

MAGNETIC RECORDING APPARATUS

Filed May 8, 1952 6 Sheets-Sheet 3

Inventor
E. Schroter
By Fetherstonhaugh & Co.
Attorneys

Nov. 19, 1957 E. SCHROTER 2,813,686

MAGNETIC RECORDING APPARATUS

Filed May 8, 1952 6 Sheets-Sheet 4

Inventor
E. Schroter
By Fetherstonhaugh & Co.
Attorneys

Inventor
E. Schroter
By Fetherstonhaugh & Co.
Attorneys

Nov. 19, 1957 E. SCHROTER 2,813,686

MAGNETIC RECORDING APPARATUS

Filed May 8, 1952 6 Sheets-Sheet 6

Inventor
E. Schroter
By Fetherstonhaugh & Co.
Attorneys

United States Patent Office 2,813,686

Patented Nov. 19, 1957

2,813,686

MAGNETIC RECORDING APPARATUS

Edward Schroter, York Mills, Toronto, Ontario, Canada

Application May 8, 1952, Serial No. 286,840

22 Claims. (Cl. 242—55.12)

This invention relates to improvements in magnetic recording apparatus, and constitutes an advancement in the art stemming from the magnetic sound recorder shown and described in my co-pending patent applications Serial No. 48,291, filed Sept. 8, 1948, now Patent No. 2,712,369, and 75,553, filed Feb. 10, 1949, now Patent No. 2,617,920.

An object of this invention is to provide an improved magnetic recording apparatus by means of which a single machine serves as both a recording and transcribing device and complete control of the tape is had in either recording or transcribing operation.

Another object of this invention is to provide a driving mechanism for the winding and re-winding of a tape about a pair of reels whereby, particularly in the winding operation, translation from indirect to direct drive of a winding turntable can be effected by frictional application of a driving wheel located intermediate a pair of winding and re-winding turntables.

Another object is to provide an improved actuating mechanism for translating movement of the friction driving wheel from indirect to direct drive of a winding turntable, said mechanism being also operable to release normal frictional contact of a brake with said winding turntable during winding operation.

A further object is to provide an improved stop-start control mechanism for a capstan serving to feed a tape past a recording head at a fixed rate of speed to a winding turntable.

A still further object is to provide a back-spacer mechanism for automatically shifting the apparatus from any one of its winding positions to its rewind position and then return the apparatus to a predetermined winding operation.

Still another object is to provide an improved actuating mechanism for simultaneously moving a pressure pad and a pressure pulley into pressure engagement with a reproducing head and a capstan respectively, to position a tape in operable contact with said head and to feed the tape past the head at a fixed rate of speed.

Still another object is to provide an improved demountable cartridge assembly for carrying a tape so as to selectively position the tape into and out of engagement with a reproducing head carried by the main body of the apparatus and to establish a drive connection with a capstan carried by the main body of the apparatus for feed of the tape past said head at a constant predetermined rate of speed.

Still another object is to provide switches on a microphone or foot pedal to control a capstan "start-stop" mechanism and a "back-spacer" mechanism and thereby provide convenient control over the operation of the magnetic recording apparatus.

The above and other objects and characteristic features of this invention will be understood more readily from the following detailed description taken in connection with the accompanying drawings, in which.

Many recording machines on the market, and particularly the type utilizing a stylus, require separate machines for recording and transcribing. While certain machines are provided with play-back apparatus, none of the machines heretofore developed gave the operator sufficient control over the operation of the machine in either recording or transcribing operation to make the machine useful to its fullest extent.

My invention broadly contemplates providing magnetic recording apparatus whereby an operator can manually control the operation to place the machine in condition to record sound, play-back a recording, rapidly wind the tape, and rewind the tape. My invention further provides electrical controls whereby the feed of the tape may be stopped in either the listening or recording operation, and the machine may be automatically changd from rewinding, play-back, recording or rapid tape winding operation to rewinding or listening operation. The controls are arranged to provide greatest convenience to the operator.

Figures 1, 17, 22, 23, 24:
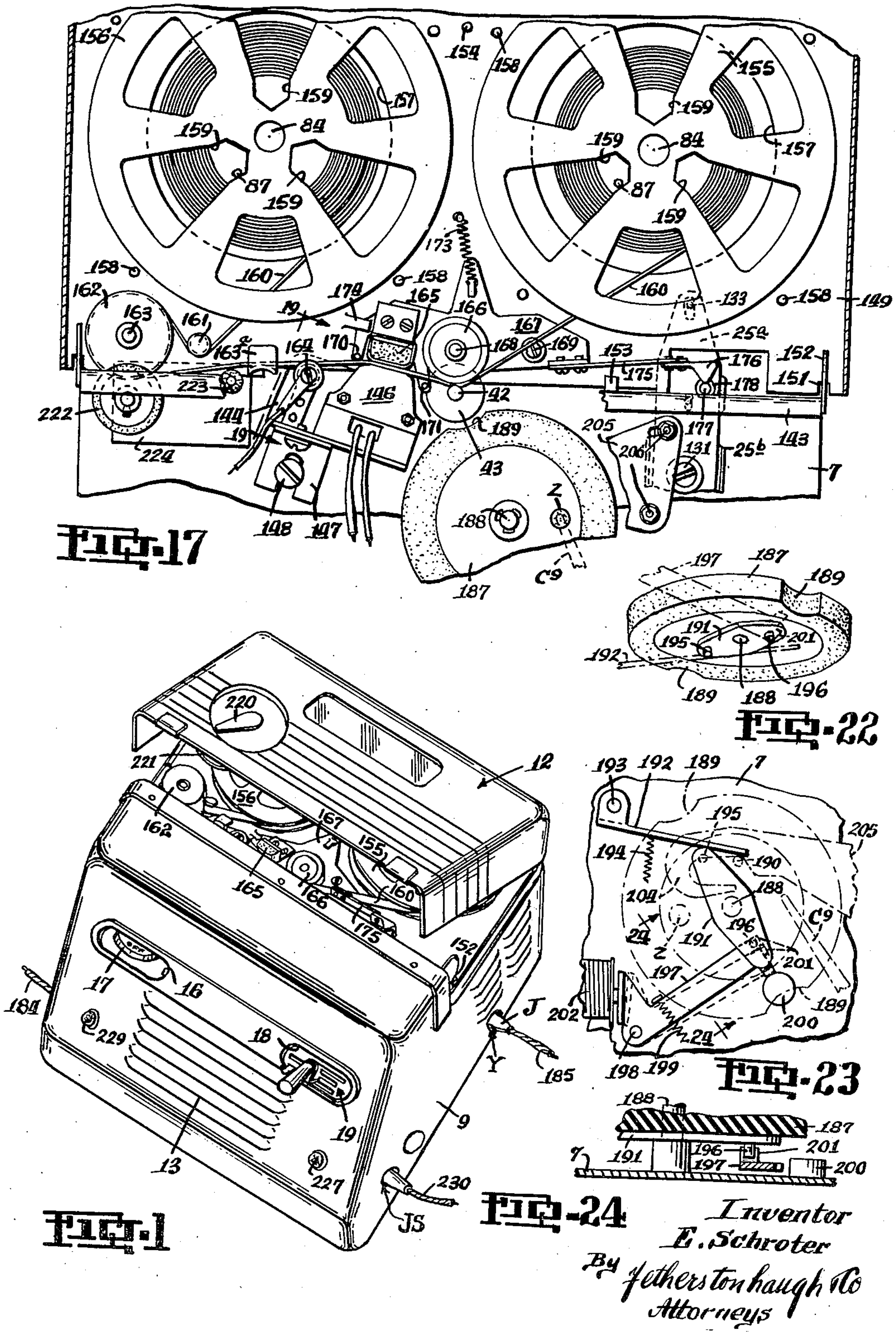
Fig. 1 is a perspective view of an apparatus embodying my invention, showing the cover of a cartridge in an open position.
Fig. 17 is an enlarged fragmentary view in plan of the cartridge assembly and related portions of the main assembly, the cartridge cover and certain other portions being broken away for the sake of clarity.
Fig. 22 is a perspective view showing the under side of the back-spacer disc shown in Fig. 2 but in another relation to the remaining elements of the back-spacer mechanism.
Fig. 23 is a top plan view of the back-spacer mechanism taken below the lower surface of the back-spacer disc and showing the mechanism in another position from that shown in Fig. 2.
Fig. 24 is a sectional view taken along the lines 24—24 of Fig. 23.
Figure 2:
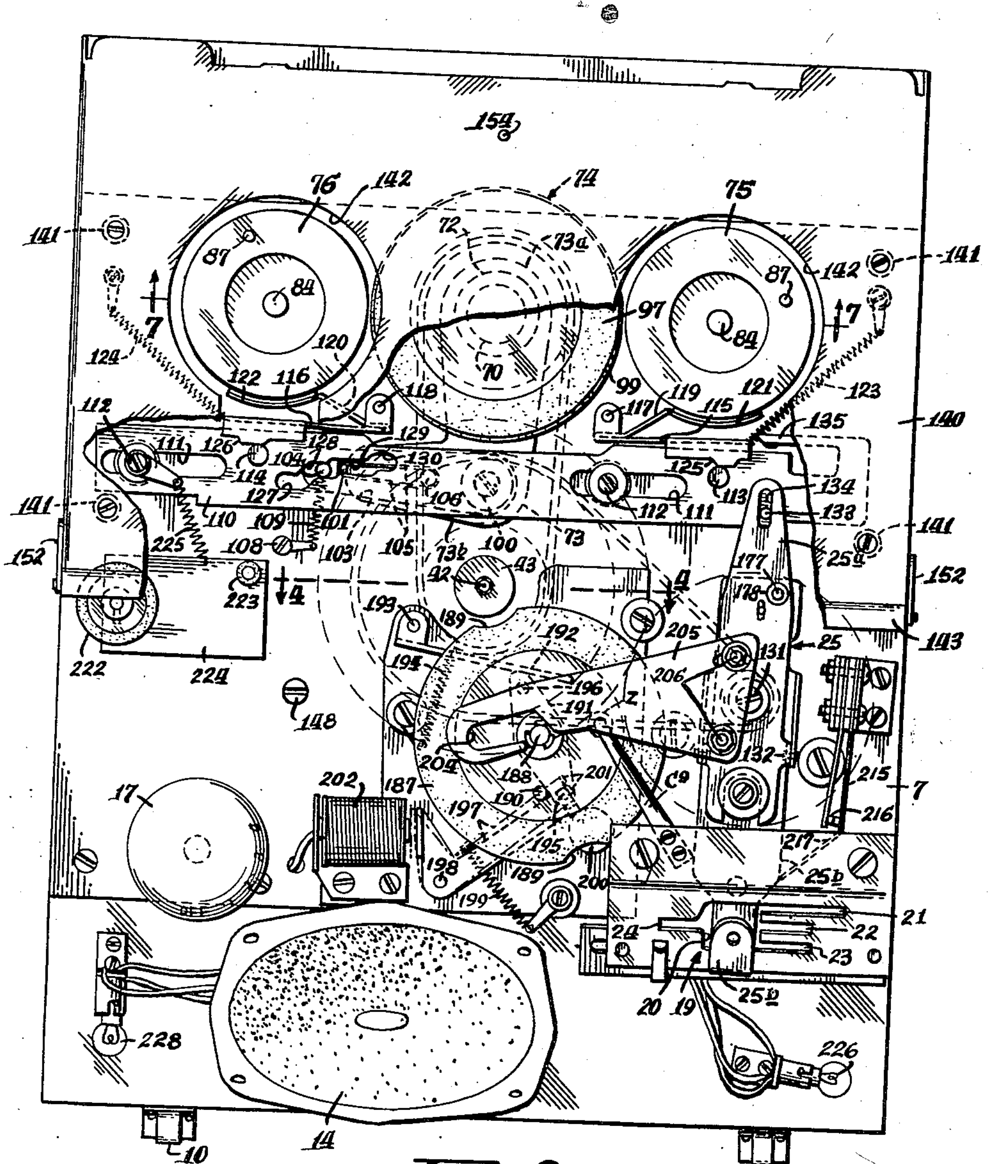
Fig. 2 is a top plan view of my apparatus with the cartridge and shell removed and a portion of the rear section cover plate broken away for the sake of clarity.
Figures 3, 9, 10, 11, 20, 21, 25:
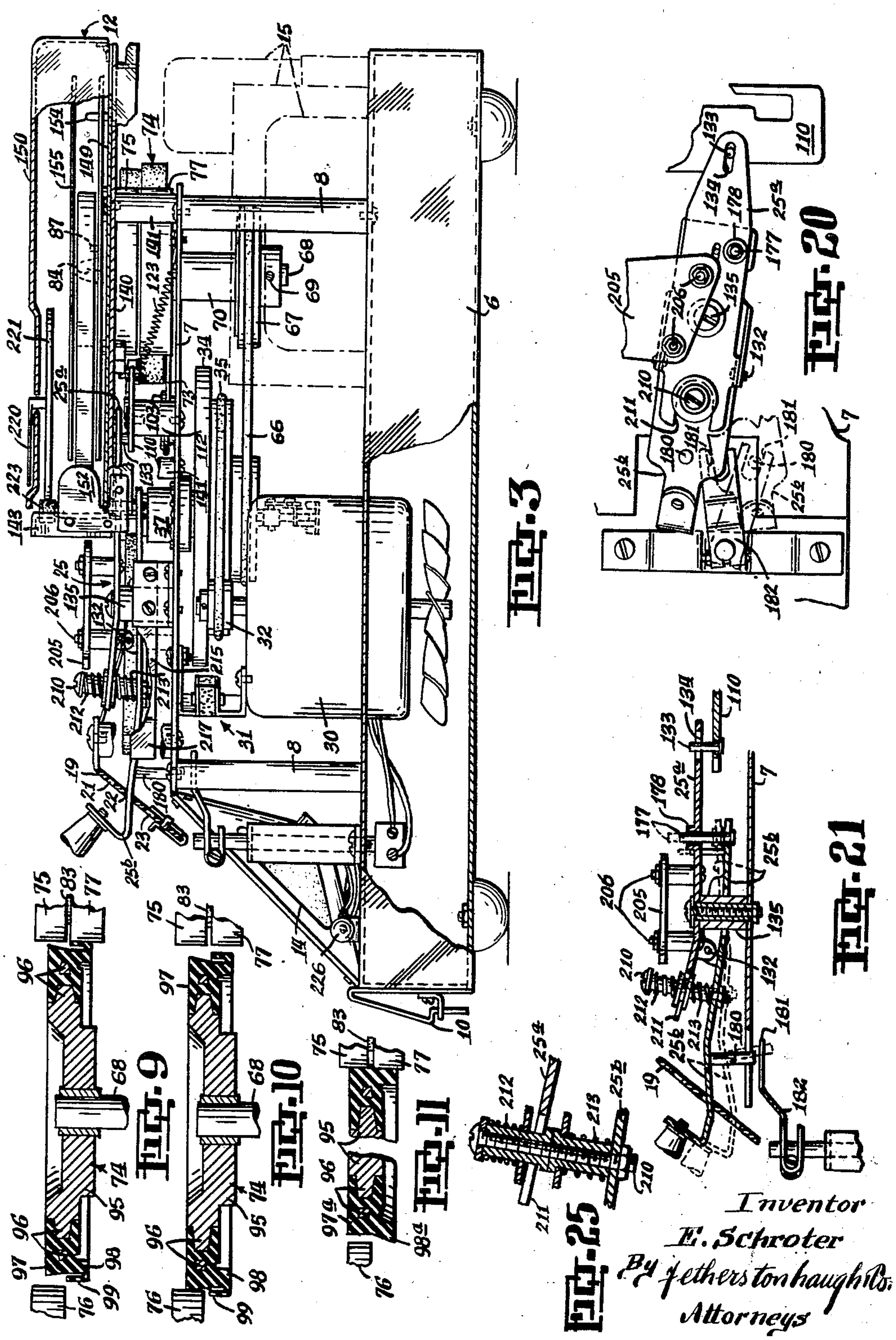
Fig. 3 is a side elevational view of the apparatus shown in Fig. 2, but showing the cartridge assembled thereon, certain of the cartridge and housing portions being broken away for the sake of clarity.
Fig. 9 is a vertical sectional view taken through the driving disc shown in Fig. 7.
Fig. 10 is a view similar to Fig. 9 but showing the disc in a new position.
Fig. 11 is a fragmentary view of a modified form of driving disc, also showing another position of a driving disc.
Fig. 20 is an enlarged detail in plan of the lever arm mechanism shown in Fig. 2.
Fig. 21 is a vertical sectional view of the mechanism shown in Fig. 20.
Fig. 25 is an enlarged detail in section of a fragment of the mechanism shown in Fig. 21.

Referring more particularly to the drawings, Figs. 1, 2 and 3 disclose a housing, for a magnetic recording apparatus, including a base 6, a platform 7 mounted on posts 8 and generally dividing the housing into upper and lower compartments. A removable shell 9 is fitted over the entire housing and is secured in place by means of spring clips 10 at the front of the base 6. The upper rear section of shell 9 is cut away to receive a removable cartridge assembly 12, hereinafter more fully described. The front face of the shell has a grill 13 behind which is fitted a loud speaker 14 which is connected to the recording electrical equipment, generally indicated at 15, in lower compartment.

The front of shell 9 has an opening 16 through which a combination switch and volume control disc 17 projects. Disc 17 having numerical graduations thereon is rotatably mounted for purposes of volume control of the amplifier. A second opening 18 affords the view of a gate 19 mounted behind said second opening. Gate 19 is provided with a central vertical track 20 communicating with an upper horizontal track 21 at the right of said vertical track and hereinafter known as the "high speed forward" track; an intermediate horizontal track 22 at the right of the vertical track, known as the "listening" track; a lower horizontal track 23 at the right of said vertical track, known as the "recording" track; and an intermediate horizontal track 24 at the left of said vertical track, and known as the "reversing" track. The "high speed forward" track 21 is substantially longer than either of the "listening" and "recording" tracks 22 and 23, as will be explained hereinbelow. "Reversing" track 24 is aligned with "listening" track 22, the purpose of which will also be set forth in detail. A lever arm 25 projects through gate 19 and opening 18 and is selectively movable along each of the tracks of said gate. The function of the lever arm will be described hereinafter in detail.

Figures 4, 5, 6, 7, 8, 14, 15:
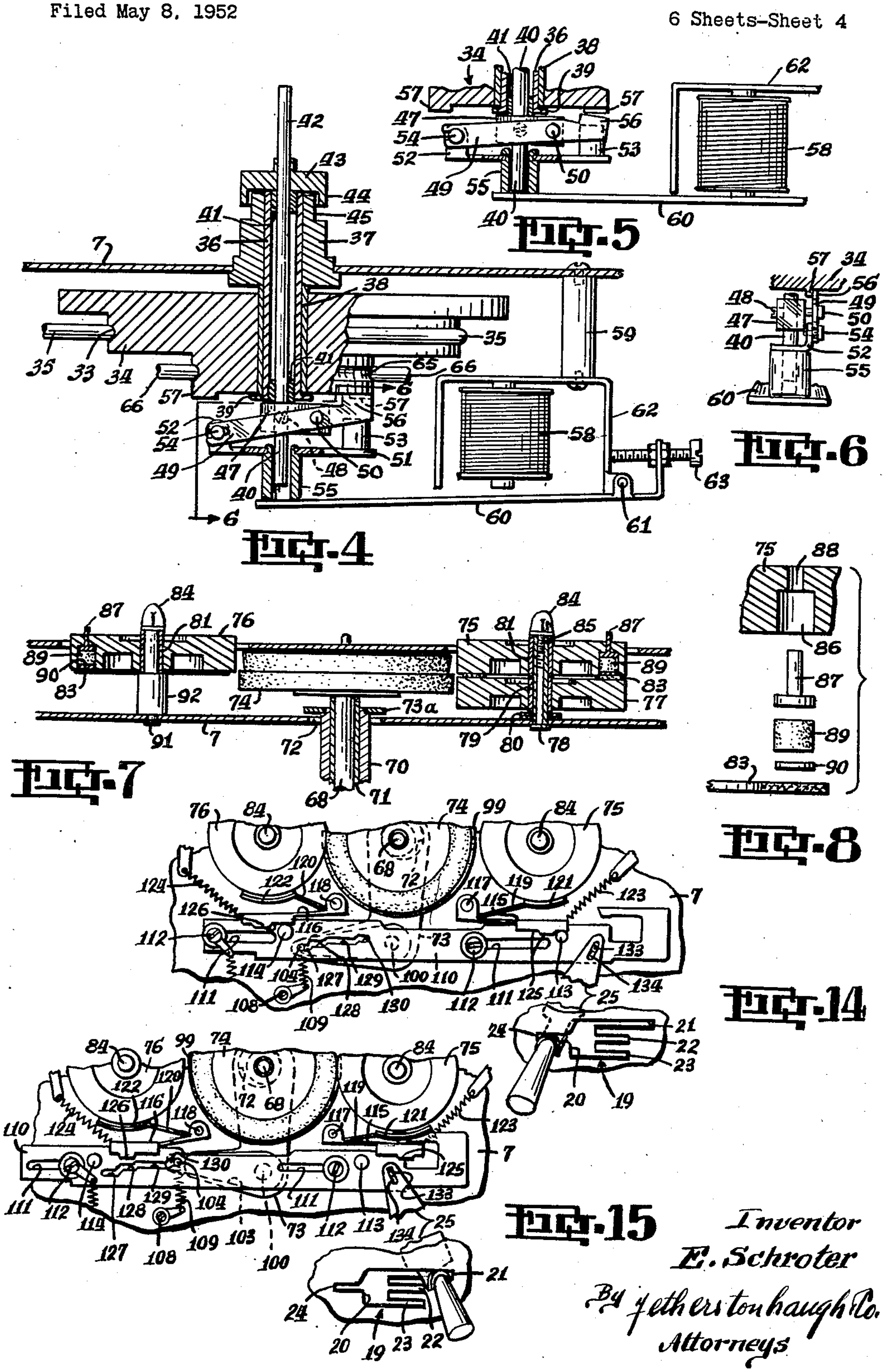
Fig. 4 is a vertical sectional view taken along the lines 4—4 of Fig. 2.
Fig. 5 is a partial view of the assembly shown in Fig. 4, but with certain parts thereof in different positions.
Fig. 6 is an end view of the apparatus shown in Fig. 5.
Fig. 7 is a vertical sectional view taken along the lines 7—7 of Fig. 2.
Fig. 8 is an enlarged view, exploded, of a section of one of the turntables shown in Fig. 7.
Fig. 14 is a fragmentary view similar to the detail of the winding mechanism and braking mechanism as shown in Fig. 2, but showing the mechanisms in another position.
Fig. 15 is a view similar to Fig. 14, but showing the mechanisms in another position.

As will be seen in Figs. 2 and 3, a conventional motor 30 is suspended from platform 7 by a shock absorbing device generally indicated at 31, which serves to neutralize the vibrations of the motor. A pulley 32 on the motor shaft is connected to belt groove 33 (Fig. 4) of a fly-wheel 34 by belt 35. The fly-wheel 34 is carried by a fixed sleeve 36 suspended from platform 7. As shown in Fig. 4, the upper end of sleeve 36 is secured in the bore of a block 37 which projects through an opening in platform 7 and is suitably secured thereto. A bearing 38 fitted in the bore of fly-wheel 34 provides free rotation of the fly-wheel about the depending portion of sleeve 36. A flange 39 on the lower end of sleeve 36 retains the fly-wheel on said sleeve. A spindle 40 extends through sleeve 36. Upper and lower bearings 41 permit free rotation of the spindle within said sleeve. The upper protruding end of spindle 40 serves as a capstan 42, the purpose of which will be more fully described, and has a collar 43 fixed thereto adjacent block 37 for rotation with the capstan. Collar 43 rests on the upper end of upper bearing 41 and is provided with a depending skirt 44 which overlaps the narrowed upper portion 45 of block 37.

As shown in Figs. 4, 5 and 6, the lower protruding end of spindle 40 has a bar 47 slidably fitted thereon and secured thereto by a set screw 48. Bar 47 carries an arm 49 which is pivoted intermediate its length to bar 47 at 50. A plate 51, having an upturned flange 52 at one end and a counter weight 53 at the other end, is pivotally connected, as indicated at 54, by flange 52 to one end of arm 49. Plate 51 has a central opening with a tubular guide member 55 secured to the under side of plate 51 around said central opening into which the lower end of the spindle 40 is received. The free end of arm 49 has an upwardly projecting dog 56 which is engageable with projecting lugs 57 on the under side of fly-wheel 34. A solenoid 58 suspended from platform 7, as indicated at 59, carries an actuating arm 60 which is pivoted at one end, as indicated at 61, to the supporting frame 62 of the solenoid. An adjusting screw 63 regulates the swing of arm 60 about its pivotal axis 61. The free end of arm 60 supports the tubular guide member 55.

When solenoid is de-energized, as shown in Fig. 4, tubular member 55 is allowed to drop down, thus swinging pivoted arm 49 to engage the dog 56 at the free end thereof with the projecting lugs 57 on the under side of fly-wheel 34. This affords positive drive of the capstan 42. When solenoid 58 is energized, as shown in Fig. 5, actuating arm 60 is swung upwardly thereagainst, raising guide member 55 on the lower portion of the spindle 40. This, in turn, causes arm 49 to rotate about its pivotal axis 50 until dog 56 is disengaged from lug 57 to thereby break the positive drive engagement of the capstan.

Fly-wheel 34 is provided with a second belt groove 65 of substantially lesser diameter than belt groove 33. A belt 66 around groove 65 connects the fly-wheel to a friction driving wheel operating pulley 67 secured to a drive shaft 68 (see Fig. 3) by a set screw 69 to rotate therewith. As shown in Fig. 7, shaft 68 is mounted to rotate in a stationary sleeve 70 having a bearing 71. Sleeve 70 projects through an enlarged opening 72 in platform 7 and is secured to one arm 73a of a crank lever 73 about an opening therein. The upper end of bearing 71 projects beyond the lever arm 73a in support of a friction driving wheel 74 secured to the upper end of shaft 68 for rotation therewith.

Friction driving wheel 74 is rotatably mounted above platform 7 between a pair of turntables 75 and 76 (see Figs. 2 and 7). Turntable 75, hereinafter referred to as the "winding turntable" is mounted on a drum 77 to rotate therewith. A fixed centering pin 78 carried by platform 7 serves as a common axis for drum 77 and "winding turntable" 75. Drum 77 has a bearing 79 in its central bore which when fitted on pin 78 permits free rotation of the drum about said pin. Spacer bearings 80 are located between platform 7 and drum 77 to facilitate rotation of said drum. "Winding turntable" 75 also has a bearing 81 in its central bore for free rotation of the "winding turntable" about said pin when fitted thereon. The adjacent edges of bearings 79 and 81 project to provide a bearing surface between drum 77 and "winding turntable" 75. The under side of "winding turntable" 75 is provided with a pad 83 of felt or other suitable material which affords light frictional contact between the drum and "winding turntable." A cap screw 84 is threadedly secured in the upper end of centering pin 78, as indicated at 85 to retain the "winding turntable" and drum on the pin. The head of screw 84 serves as a centering means about which a tape reel is mounted for rotation. The "winding turntable" is recessed in its under side, as indicated at 86 (see also Fig. 8), to receive a pin 87, the shank portion of which projects through a narrow opening 88 from the inner end of recess 86 to extend beyond the upper surface of the "turntable." The head of pin 87 limits the extent of projection of the pin through opening 88. When the pin is fitted in recess 86 it is backed by a resilient cushioning member 89 which in turn is sealed in the recess by a disc 90. Cushioning member 89 permits retraction of pin 87 against the resilient biasing of the cushioning member. Pin 87 engages a tape reel when the latter is centered on the cap screw 84 for rotation of said reel with the "winding turntable."

Turntable 76, hereinafter referred to as the "re-winding turntable," and being preferably of the same construction as "winding turntable" 75, is mounted for rotation about a pin 91 carried by platform 7. A spacer 92 on pin 91 supports "re-winding turntable" and a cap screw 84, fitted on pin 91 as previously described, retains said "re-winding turntable" on said pin. The second cap screw 84 serves as a centering means for a second tape reel when mounted thereon. Pin 87 projecting through "re-winding turntable" engages said reel for rotation of the latter with the "re-winding turntable."

As shown in detail in Figs. 9 and 10, friction driving wheel 74 comprises a metal disc 95 having a tapered rim 96 with spaced transverse openings therein, and a resilient tire 97 of rubber or other suitable material moulded about said rim with binding portions of the moulded material extending through the transverse openings in the rim. The upper section of tire 97 is substantially solid while the lower section is provided with a depending skirt 98 having an upturned resilient peripheral friction collar 99 which is spaced from the outer edge of the tire. The upper section of tire 97 is on a plane with the "winding" and "re-winding" turntables 75 and 76 while the peripheral collar is on a plane with the drum 77. When it is desired to operate the "winding turntable" for "listening" or "recording," friction driving wheel 74 is moved toward drum 77, as shown in Fig. 9, so that the collar 99 of tire 97 engages drum 77 for positive drive of said drum. It will be seen that, as "winding turntable" is spaced from tire 97 it must receive its driving force through friction pad 83 from drum 77. Fig. 10 shows the solid upper section in driving engagement with the "re-winding turntable" 76. In Fig. 11 I have shown a modified form of tire **97*a* in which the depending skirt 98*a* is outwardly flared. Skirt 98*a* normally engages drum 77 for rotation in the "listening" and "recording" positions while the upper solid section of the tire engages "re-winding turntable" 76 when the friction driving wheel 74 is moved to engage same. When it is desired to obtain "high speed forward" winding, driving wheel 74 is moved toward "winding turntable" 75 beyond the position of "listening" or "recording" by compressing skirt 98*a* against drum 77 until the upper solid section of tire 97*a* is brought into frictional contact with turntable 75 for positive drive of same. To obtain positive drive between the "winding turntable" 75 and tire 97 shown in Figs. 9 and 10, collar 99 is compressed against drum 77 in the same manner until the upper solid section of the tire is brought into frictional contact with "winding turntable" 75**.

By referring to Figs. 2, 3 and 7, it has been described how the friction driving wheel 74 and the driving pulley 67 therefor are mounted to rotate together about a common axis 68 carried by one arm **73*a* of a crank lever 73. Referring now to Figs. 2, 7, 12 and 13, crank lever 73 is pivotally mounted, intermediate its two arms 73*a* and 73*b*, on a pin 100 carried by platform 7, to permit swinging movement of friction driving wheel 74 to selective positions of driving engagement with turntables 75, 76 and drum 77. In this connection it will be seen that the enlarged opening 72 in platform 7 permits freedom of movement of sleeve 70 carried by crank lever arm 73*a* during swinging movement of the friction driving wheel. The other arm 73*b* of crank lever 73, which is at right-angles to arm 73*a*, is provided at its outer end with a pin 101 which projects upwardly through an elongated slot 102 extending transversely of a crank lever actuating arm 103 overlying said crank lever arm 73 and pivotally connected at one end to pin 100 to rotate about a common axis with said crank lever arm 73. Actuating arm 103 has a post 104 mounted thereon adjacent its free end, by means of which the arm is rotated. A resilient pressure spring 105 bent around a post 106 carried by arm 103 has its two free ends disposed on either side of pin 101 in resilient pressure engagement therewith. Arm 103 has a tongue 107 adjacent transverse slot 102 which projects upwardly between the two arms of spring 105. The rotating friction driving wheel 74 is selectively swung into frictional engagement with turntables 75, 76 and drum 77, by rotation of actuating arm 103, through the medium of a cam bar 110 acting against post 104 in a manner hereinafter more fully described. When actuating arm 103 is rotated in either direction about its pivotal axis 100, one of the resilient arms of spring 105 bears against pin 101 to rotate crank lever 73 in the same direction about the common pivotal axis 100. Slot 102 and spring 105 afford a resilient movement to lever 73 which provides a cushioning effect when contact is made between the driving wheel and either of the turntables or drum 77**.

During the initial movement of arm 103, the arms of spring 105 which are arranged to exert pressure on both sides of the pin 101 of lever arm **73*b*, both continue to exert their biasing pressure although the spring arm which moves the crank arm lever pin 101 must overcome the biasing pressure of the opposing spring arm. Thus the friction driving wheels initial contact with the selected turntable or drum is amply cushioned to reduce the shock of contact. As resilient biasing pressure is further exerted by the first mentioned spring arm, the tongue 107 of arm 103 is compressed against the other spring arm to overcome its biasing pressure on pin 101. Thus the entire biasing pressure of the first mentioned spring arm is exerted against pin 101 to increase the frictional pressure of the friction driving wheel. A light spring 109 anchored to platform 7 at 108 is linked to actuating arm 103 and tends to exert a slight resistance to rotation of arm 103 in a clock-wise direction and to accelerate rotation, in a counter-clockwise direction. Rotation of arm 103 in a clock-wise direction moves friction driving wheel 74 into engagement with either "winding turntable" 75 or drum 77 to rotate either turntable 75 or drum 77 in a counter-clockwise direction. Counter-clockwise rotation of arm 103 moves the friction driving wheel 74 into contact with re-winding turntable 76** and imparts a counter-clockwise rotation thereto.

Figures 12, 13, 26:
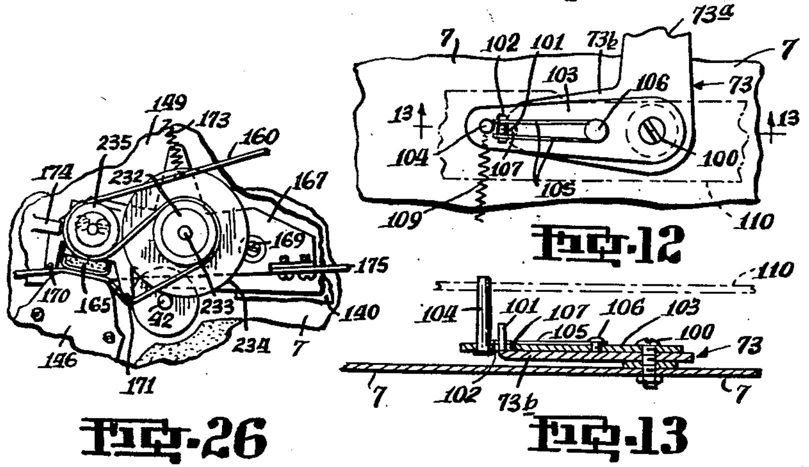
Fig. 12 is an enlarged fragmentary view in plan of the driving wheel pivotal mounting mechanism, the view being taken below the cam bar shown in Fig. 2.
Fig. 13 is a vertical sectional view taken along the lines 13—13 of Fig. 12.
Fig. 26 is a fragmentary detail, in plan, showing a modification of the cartridge tape control mechanism shown in Fig. 17.

Proceeding now to Figs. 2, 14, 15 and 16, I have shown a braking mechanism for the "winding" and "re-winding" turntables 75 and 76 which are synchronized to function with the manipulation of the friction driving wheel lever mechanism (see Figs. 12 and 13). A transverse cam bar 110 provided with elongated slots 111 is mounted on posts 112 which project through slots 111 for lateral slidable shifting movement of the bar in its lengthwise direction. Cam engaging trunnions 113 and 114 are mounted on bar 112 adjacent one side edge thereof to engage brake levers 115 and 116 respectively. These brake levers are each pivotally mounted on platform 7 at 117 and 118. Flexible brake arms 119 and 120 extend from the pivotal ends of levers 115 and 116 respectively in spaced back-to-back relation. The free ends of arms 119 and 120 are provided with brake shoes 121 and 122 which are arranged to bear against turntables 75 and 76 respectively. Light springs 123 and 124 fastened at one end to platform 7 and having their other ends secured to the free ends of levers 115 and 116 respectively, tend to rotate levers 115 and 116 about their pivotal axes 117 and 118 to apply light frictional contact between the brake shoes 121 and 122 and the corresponding turntables 75 and 76. Brake levers 115 and 116 have cam projections 125 and 126 along one side adjacent their free ends which engage trunnions 113 and 114 respectively.

Cam bar 110 is provided with a cam slot shaped to provide four stepped parallel paths 127, 128, 129 and 130 successively connected by inclined ramps. Post 104 of crank lever actuating arm 103 rides in said cam slot from one path to another to rotate the friction driving wheel crank lever 73 an amount predetermined by the path into which post 104 is guided when cam bar 110 is shifted. Lateral shifting of cam bar 110 is effected through lever arm 25 which is pivotally mounted intermediate its length on a post 131 to rotate about a vertical axis. Arm 25 is divided into upper and lower members **25*a* and 25*b* which are hinged at 132 so that member 25*b* pivots about a horizontal axis. A pin 133 carried by cam bar 110 projects into a slot 134 in the inner end of lever arm member 25*a* which overlies bar 110. The lower member 25*b* of lever arm 25 projects through the gate 19 behind the openings 18 in the front wall of shell 9**.

When the friction driving wheel 74 is in its neutral position, as shown in Fig. 2, that is, in spaced relation to both of the turntables 75 and 76, the lever arm member is in the vertical or "neutral" track 20 of gate 19. In this position, also, post 104 of the actuating arm 103 of the friction driving wheel crank lever 73 is in the path 128 of the cam slot in cam bar 110, and the brake cam engaging trunnions 113 and 114 are on the crowns of the cam projections 125 and 126 respectively of brake levers 115 and 116 so that brake shoes 121 and 122 are exerting full braking pressure on the "winding" and "re-winding" turntables 75 and 76.

Figure 16:
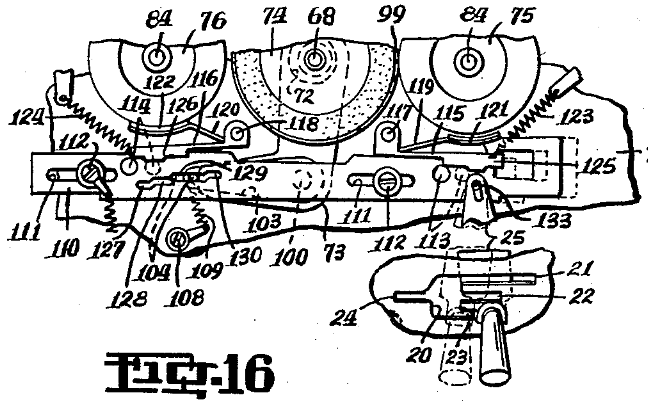
Fig. 16 is a view similar to Figs. 14 and 15, but showing the mechanisms in still another position.

In order to effect driving in the "recording" position, lever arm member **25*b* is pivoted about its horizontal axis 132 and depressed in track 20 of gate 19 and then rotated about its vertical axis 131 in the counter-clockwise direction along track 23, as shown in Fig. 16. Arm member 25*a* acting against pin 133 shifts cam bar 110 to the left. In the initial stage of the shifting of cam bar 110, trunnion 113 rides down the left side of the crown of cam 125, as shown in dotted line, releasing brake 121 as crank lever actuating arm post 104 rides up the ramp from path 128 to path 129 of the post cam slot. An inwardly projecting finger member 135 at one side of cam bar 110 slides behind the free end of brake lever 115 to prevent the spring 123 from applying light frictional pressure on brake 121. It will also be seen that at this stage trunnion 114 is still on the crown of cam 126, as indicated by dotted line. The movement of post 104 up the ramp between paths 128 and 129 is sufficient to rotate crank lever 73 in a clockwise direction to bring the skirt 99 of friction driving wheel 74 into driving engagement with drum 77 (see Figs. 7 and 9). Thus it will be seen that braking pressure is being gradually released from "winding turntable" 75 as the friction driving wheel is moving into frictional engagement with drum 77 and braking pressure is being maintained on "re-winding turntable" 76. This permits the take-up of any slack in the tape between reels mounted on the said turntables. By reason of the fact that there is only light frictional contact between drum 77 and "winding turntable" 75 through felt 83 (see also Figs. 7 and 9), the tape will then be held taut without imposing excessive strain thereon until the "re-winding" turntable brake 122 is released. Continued movement of lever arm member 25*b* along track 23 to the position shown in Fig. 16, positions post 104 at the remote end of path 129 and causes the trunnion 114 to ride down the left side of the crown of cam 126 to release the brake 122. Spring 124 maintains a light tension on brake lever 116 for light frictional engagement between brake 122 and turntable 76** to maintain a light tension on the tape.

In order to effect driving in the "listening" position, lever arm member **25*b* is moved from the "neutral" track 20 in a counter-clockwise direction along track 22**. The resulting sequence of operations of the apparatus, insofar as it has been described, are identical with the operations as above described in the "recording" position.

When it is desired to effect a "high speed forward" drive, lever arm member **25*b* is moved from the neutral track 20 in a counter-clockwise direction along "high speed forward" track 21, as shown in Fig. 15. The initial sequence of operations will be the same as above described in connection with effecting the "recording" position. As previously mentioned the "high speed forward" track 21 is longer than the "listening" and "recording" tracks. Thus continuation of member 25*b* along track 21, after the sequence of operations for "recording" have been completed, effect guiding of post 104 up the inclined ramp between path 129 and 130 to further rotate crank lever 73 until the upper solid section of tire 97 frictionally engages "winding turntable" 75 (see also Fig. 11). As previously explained, this is accomplished by distorting the flexible skirt 98 or 98*a* against drum 77. In this position "winding turntable" 75 is driven at a speed directly governed by the speed of the friction driving wheel 74**. However, the shifting from "neutral" to direct "high speed forward" drive was intercepted momentarily by the first stage operations to modify the shock which would otherwise occur.

To effect "re-winding" of a tape, lever arm member **25*b* is moved from the neutral track 20 in a clockwise direction, as shown in Fig. 14. Arm member 25*a* acting against pin 133 shifts cam bar 110 to the right. In the initial stage of shifting of cam bar 110 trunnion 114 rides down the right side of the crown of cam 126 to release brake 122 as crank lever actuating arm post 104 descends the ramp from path 128 to path 127 of the post cam slot in bar 110 to rotate crank lever 73 in a counter-clockwise direction for frictional engagement of the upper solid section of tire 97 with "re-winding turntable" 76. Although the braking pressure applied by trunnion 114 against cam 126 is released, spring 124 maintains a light frictional contact between the brake and "re-winding turntable" 76. It will be noted that in the initial stage trunnion 113 is on the crown of cam 125, maintaining braking pressure on "winding turntable" 75. As the post 104 continues to descend the ramp between paths 127 and 128, trunnion 113 rides down the right side of the crown of cam 125 to release the brake 121. This permits the take-up of any slack in a tape between reels. However, spring 123 applies a light braking pressure between brake 121 and turntable 75 to maintain tension on the tape. Springs 123 and 124** also serve to control the turntables during the shifting from a driving to the neutral position to ensure that tension is maintained on the tape at all times.

Referring now particularly to Figs. 1, 2, 3, 17, 18 and 19, the rear section of the recording apparatus has a cover plate 140 mounted on posts 141 carried by platform 7 at the level of the recessed rear section of shell 9. Plate 140 has openings 142 through which the turntable 75 and 76 project, and has an upwardly projecting front wall member 143 which closes the vertical gap between plate 140 and the adjacent edge of the front section of shell 9. Wall 143 has openings therethrough, the purpose of which will become more apparent.

Figure 19:
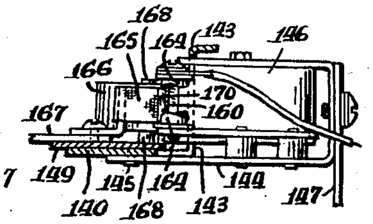
Fig. 19 is a vertical sectional view taken along the lines 19—19 of Fig. 17.

The forward end of cover plate 140 carries a supporting plate 144 which is U-shaped in cross section. One side of plate is secured at 145 to project beyond front wall 143 with its other free side overlying same, as shown in Fig. 19. A combination recording head and eraser 146 is suspended from the overlying side of plate 144 with the working surfaces of the head and eraser extending rearwardly and projecting through an opening in wall 143.

An L-shaped bracket 147 secured to the web of plate 144 has its free leg secured to a screw clamp 148 in platform 7 to provide rigid support of the combination head and eraser member 146 (see also Fig. 17.).

The cartridge assembly 8 is removably mountable on plate 140 to overlie turntables 75 and 76. The assembly is housed in a casing including a bottom wall 149 having a cover 150 hinged thereto along its rear edge. The front of the bottom wall 149 is slotted at 151, adjacent each side, to interlock with slotted wings 152 carried by and projecting rearwardly of the plate front wall 143 for securing the front section of the cartridge casing to the housing. Tongues 153 projecting from the front wall 143 also overlie portions of the adjacent front edge of cartridge bottom wall 149 in retaining engagement. Plate 140 also carries a centering post 154 at the central rear section of the plate which is receivable in a complementary opening in the rear section of the cartridge casing bottom wall 149. A pair of reels 155 and 156 are arranged in the casing over openings 157 in the bottom wall 149 of the casing. Reels 155 and 156 are retained in approximate position by confining pins 158, arranged about the periphery of the reels so that when the cartridge assembly is mounted over the turntables the central openings in the reels will receive the centering pins 84 of the turntables 75 and 76. Reels 155 and 156 are brought to bear against the upper surfaces of the turntables which project through openings 157 in the bottom wall 149 of the cartridge casing with the placement of the cartridge on cover plate 140. The turntable locking pins 87 engage in one of the radially arranged slots 159 of the reel spiders to rotate said reels.

A recording tape 160 which is originally wound around reel 156, is trained around a post 161 and thence around a pulley 162 mounted on a vertical axis pin 163 carried by bottom wall 149 in front of a guide bracket **163*a* carried by bottom wall 149 and a guide post 164 carried by U-shaped supporting plate 144 (see also Fig. 19). Post 161 is positioned on bottom wall 149 to provide the maximum amount of bearing surface between the tape 160 and pulley 162, the reason for which is disclosed hereinbelow. The tape then passes between a pressure pad 165 mounted on the cartridge and the combination head 146 and thence around a pressure pulley 166 carried by the cartridge, with the free end of the tape secured to reel 155**.

Pressure pulley 166 is mounted on a rotatable plate 167 in front of capstan 42 with the tape therebetween. Pulley 166 rotates about an axis pin 168 carried by plate 167 at a point intermediate one end and the plate vertical pivotal axis 169 carried by the bottom wall 149 of the cartridge. Pressure pad 165 is mounted on plate 167 beyond pressure pulley 166 to swing with said plate opposite the combination head 146. A post 170 carried by plate 167, at one side of pressure pad 165 in advance of the head 146, is positioned behind the tape to exert pressure thereon when pad 165 is swung by plate 167 in a counter-clockwise direction into pressure engagement with the combination head with the tape therebetween. Post 170 ensures that the surface of the tape is brought to bear against the head well in advance of points on the working surface of the head which effect erasure and reproduction. A second post 171 carried by plate 167 beyond the pressure pad 165 is positioned in front of the tape and in advance of capstan 42. Post 171 serves to move the tape at that point away from the capstan when the pressure pulley 166 is swung by plate 167 in a clockwise direction away from the capstan. A spring 173 having one end anchored to the cartridge bottom wall 149 and the other end secured to plate 167, on the side thereof carrying the pressure pad and pulley, normally tends to rotate said plate in a clockwise direction about its pivotal axis 169 to move the pressure pad 165 and pressure pulley 166 away from the combination head 146 and the capstan 42 respectively. A tongue 174 projecting from the cartridge bottom wall 149 to overlie plate 167, tends to retain the plate in its normal horizontal plane and also serves to limit rotation of the plate in a clockwise direction by intercepting the path of post 170 on the end of plate 167 beyond the pressure pad 165.

The end of plate 167, on the opposite side of the plate axis pin 169, carries a flexible lever arm 175 provided at its outer end on one side thereof with a cam member 176 which is actuated by lever arm 25 to rotate plate 167 in a counter-clockwise direction against the biasing of spring 173. The inner end of lower lever arm member **25*b* carries a post 177 which is slidable for vertical movement in a vertical sleeve 178 carried by upper lever arm member 25*a* when member 25*b* is rotated about its horizontal axis 132. Depression of lever arm member 25*b* to the level of the "listening" and "recording" positions projects the post 177 beyond the upper end of sleeve 178 to intercept the horizontal plane of the cam 176 of the plate flexible lever arm 175. Movement of the lever arm 25 about its vertical axis in a counter-clockwise direction along either of the tracks 22 and 23 of gate 19 brings post 177 against the cam 176 of the plate lever arm 175 to rotate plate 167 in a counter-clockwise direction, about its vertical pivotal axis 169 against the biasing of spring 173. This action causes the tape to be compressed against the combination head 146 by the pad 165 and against the capstan 42 by pulley 166 with sufficient pressure to ensure that the tape will be fed past the combination head 146** at a constant speed governed by the rotation of the capstan.

The raising of lever arm member **25*b* to "high speed forward" track level depresses post 177 below the plane of cam 176. Thus rotation of member 25*b* along track 21 does not bring the pressure pulley 166 into play with capstan 42 so that the tape 160 is free to be wound on reel 155 at the rate of speed governed by rotation of driving wheel 74 in direct pressure with turntable 75**.

As movement of lever arm 25 along "re-winding" track 24 causes a clockwise rotation of arm 25, the post 177 is moved away from cam 176. Thus pressure pulley 166 remains out of pressure engagement with capstan 42 so that the tape 160 is free to re-wind about reel 156 at a speed governed by rotation of driving wheel 74 in direct pressure with "re-winding turntable" 76.

The tape 160 is provided adjacent its opposite ends with a grounding medium (not shown) such as foil or other electrical conductor. Post 164, mounted on the U-shaped plate 144 carried by cover plate 140, is wired so that, when the grounding medium of the tape contacts post 164, a warning signal will be transmitted to indicate to an operator that the end of the tape has been reached.

In the operation of the magnetic recording apparatus the switch is turned on through disc 17 to energize motor 30 which rotates fly-wheel 34 and friction driving wheel 74 through the medium of pulley 67. Normally solenoid 58 is energized to move the dog 56 out of the path of lugs 57 on the bottom of fly-wheel 34 to thereby render the capstan 42 inoperative. When it is desired to record on the tape, lever arm 25 is depressed in "neutral" track 20. Arm member **25*b* carries a depending pin 180 which, when the arm is depressed is received in a yoke 181 of a switch arm 182 (see Figs. 20 and 21). Arm 25 is then rotated counter-clockwise along "recording track" 23. This action causes pin 180 to actuate switch arm 182 for energizing the combination magnetic head and eraser 146. At the same time lever arm 25 shifts cam bar 110 to the left, as shown in Fig. 16, to swing friction driving wheel 74 into driving engagement with drum 77. Also post 177 engages the cam 176 of arm 175 to rotate the plate 167 counter-clockwise to bring pressure pad 165 to bear against the combination head 146 and pressure pulley 166 to bear against capstan 42. The capstan 42, which is normally inoperative, will prevent feeding of the tape across head 146 so that turntable 75 is caused to slip while drum 77** is rotated.

A microphone attachment which is plugged into the apparatus at one side, as indicated at 184 in Fig. 1 is provided with a switch mechanism, the details of which will be hereinafter described, which de-energizes the solenoid 58 for rotatable engagement of the capstan 42 with flywheel 34. Thus the tape 160 is fed past the head 146 at a rate of speed governed by the speed of the capstan and is taken up on the "winding turntable" 75. A foot pedal mechanism connected at 185, (see also Fig. 1) is also provided with a switch for actuating solenoid 58.

When it is desired to listen to the recording, arm 25 is moved into track 22. The pin 180, however, is not depressed sufficiently to engage switch arm 182 so that the recording and eraser mechanism switch remains de-energized. However, the head 146 is normally energized to reproduce the recording on tape 160 when disc switch 17 is on. As for the cam 110 and plate 167, the rotation of arm 25 along track 22 produces similar results to that described in connection with the "recording position" shown in Fig. 16.

For "high speed forward" winding, arm 25 is raised and then rotated counter-clockwise along track 21, as shown in Fig. 15. The recording switch remains de-energized because pin 180 is moved away from switch arm 182. Arm member **25*a* shifts cam bar 110 to the left to swing driving wheel 74 sufficiently to cause direct drive of turntable 75. As post 177 is depressed in sleeve 178 by pivotal action of arm member 25*b*, lever arm 175 is by-passed so that plate 167 remains under tension of spring 173 with pad 165 and pulley 166 out of pressure engagement with head 146 and capstan 42 respectively. Thus the tape 160 is free to be wound about reel 155 at the rate of speed of the rotation of turntable 75**.

For "re-winding," arm 25 is rotated clockwise along track 24, as shown in Fig. 14. Here, again, the pin 180 does not engage switch arm 182. Also arm member **25*a* shifts cam bar 110 to the right which in turn swings driving wheel 74 counter-clockwise into direct driving engagement with turntable 76. As the inner end of arm 25 is moved away from lever arm 175, plate 167 is not rotated, and the tape is free to be re-wound about reel 156**.

The apparatus is provided with a "back-spacer" mechanism for the purpose of quickly rewinding a portion of the reel at any point along the length of the tape so that an operator may be able to review any desired section of the recording thereon. As will be seen in Figs. 2, 17, 22, 23 and 24, this mechanism comprises a disc 187 rotatable about a vertical axis 188 carried by platform 7. The disc is positioned so that its peripheral edge is in friction contact with the collar 43 of capstan 42 except at two opposed points which are arcuately recessed, as indicated at 189, to place said disc out of engagement with said capstan collar 43. Disc 187 has an offcentre post 190 projecting from its upper surface and an elongated substantially oval shaped cam member 191 projecting from its under side, the latter having its terminals aligned between the arcuate recesses 189. A cam arm 192 pivoted at one end to platform 7, as indicated at 193, is tensioned by a spring 194 to bear against a terminal portion of cam 191 to initiate counter-clockwise rotation of disc 187 sufficiently to bring the disc into frictional contact with the collar 43 of capstan 42. Cam 191 has two depending pins 195 and 196, the former being at a greater distance from axis pin 188 than the latter.

The starting position of disc 187 is shown in Fig. 2 with the projecting pin 195 positioned remote from capstan collar 43 and cam arm 192 in pressure engagement with the terminal portion of cam 191 remote from pin 195. A pawl arm 197 pivoted intermediate its length to platform 7, as indicated at 198, is normally biased by spring 199 to rotate in a clockwise direction. A post 200 carried by platform 7 limits rotation of pawl arm 197. One end of arm 197 is provided with an upwardly extending pawl 201 which, when the arm is against post 200, engages pin 195 to prevent rotation of disc 187 against the biasing action of cam arm 192 against cam 191. A solenoid 202 is positioned adjacent the other end of a pawl arm 197 which, when energized, trips arm 197 rotating it counter-clockwise against the biasing of spring 199 to move the arm away from post 200 to swing the pawl 201 clear of pin 195, as shown in dotted line in Fig. 2. Thus pressure on cam 191 by cam arm 192 initiates rotation of disc 187 until the outer periphery of the disc is frictionally engaged by rotating capstan collar 43. The disc is then rotated through substantially 180° until the second recess 189 breaks contact between collar 43 and disc 187. The solenoid being energized retains pawl arm 197 in its position away from post 200 so that pawl 201 intercepts the path of rotation of pin 196 at the other end of cam 191, as shown in Figs. 22, 23 and 24. This rotation of disc 187 causes offcentre post 190 on the upper side of disc 187 to engage the crook end 204 of a laterally extending arm 205 secured at one end to arm 25, as indicated at 206. If arm 25 is in any of the tracks 21, 22 or 23, pressure applied by post 190 against the crook 204 of arm 205 will rotate arm 25 about its pivotal axis 131 to move arm 25 into vertical track 20. A leveling device, hereinafter described, moves the arm 25 up opposite "re-winding" track 24 and continuing movement of arm 205 will move arm 25 into "re-winding" track 24. De-energizing solenoid 202 releases arm 197 which is rotated clockwise by the biasing of spring 199 until pawl 201 is clear of the path of rotation of pin 196. Biasing of cam arm 192 against cam 191 then initiates rotation of disc 187 until contact is established between rotating capstan collar 43 and the disc. The disc is then rotated by collar 43 until contact is broken by recess 189 at the starting position. As pawl arm 197 has been returned to its starting position, pawl 201 will intercept the path of rotation of pin 195 to retain the disc in the starting position shown in Fig. 2.

Rotation of disc 187 through the remaining 180° to the starting position automatically shifts lever arm 25, through the action of post 190 against the crook 204 of arm 205, from the re-winding track 24 to the "listening" track 22 which is horizontally aligned with track 24. This is effected by means of a levelling device, as shown in Figs. 3, 21 and 25. The device comprises a post 210 mounted on arm member **25*b* and extending through a yoke 211 in arm member 25*a*. Upper and lower springs 212 and 213 are arranged about post 210 above and below arm member 25*a* respectively. Springs 212 and 213 exert an equalizing pressure which tends to maintain arm member 25*b* in the horizontal plane of tracks 22 and 24. Depression of arm member 25*b* compresses spring 212 and elevation of the arm member compresses spring 213 so that, if arm member 25*b* is in either track 21 or 23, its movement to the "neutral" vertical track 20 will result in the positioning of arm member 25*b* in alignment with tracks 22 and 24 by the biasing of the springs 212 and 213**.

In Fig. 26, I have illustrated a modification of certain of the tape feed control elements carried by the cartridge assembly. In this connection reference will also be had to Fig. 17 for comparison. Fig. 26 shows the plate 167 pivoted at 169 with pressure pad 165 and post 170 in the same relation as shown in Fig. 17 to function in the same manner as described with reference to Fig. 17. After tape 160 passes between pressure pad 165 and head 146 it is compressed by post 171 which is located on the same side of the tape as post 170. The reason for this is that the tape is not directly compressed between a pressure pulley and the capstan 42, as shown in Fig. 17. Instead, the tape 160 passes around a pulley 232 which rotates about an axis 233 which is common to a metal friction disc 234 of substantially enlarged diameter which engages capstan 42 for rotation when the plate 167 is rotated by lever arm 25. Tape 160 then passes around another pulley 235 located behind pressure pad 165 to ensure substantial surface contact of the tape with pulley 232. From pulley 235 the tape is fed to "winding reel" 155 in the manner shown in Fig. 17. With this arrangement the rate of speed of the tape past the head 146 can be reduced according to the diameter of disc 234. Thus the same length of tape can be utilized for regular or long recordings by a simple modification of the cartridge assembly without alteration of the main apparatus. Moreover, this adjustment does not affect the "high speed forward" or "re-winding" operations of the apparatus.

Figures 18, 27, 28:
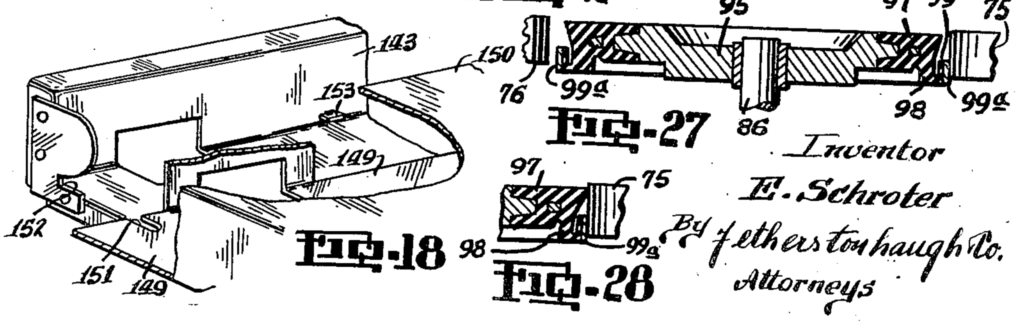
Fig. 18 is a fragmentary view in perspective, and partly broken of portions of the rear cover and the cartridge shell shown in Fig. 17.
Fig. 27 is a view showing a modification of the driving disc and turntable assembly.
Fig. 28 is a view showing a portion of the assembly of Fig. 27 in another position.

Figs. 27 and 28 illustrate a further modification of the driving wheel and turntable assembly. Driving wheel 74 has its upturned skirt collar 99 positioned between turntables 75 and 76. Collar 99 has a friction surface 99*a*, of felt or other suitable material, which extends about the outer periphery of the collar and is adapted to exert light frictional contact against turntable 75 when driving wheel 74 is moved to the "recording" or "listening" position, as shown in Fig. 27. Thus the driving wheel 74 is in direct driving contact with turntable 75 in this position but, owing to the nature of the friction surface 99*a*, slippage is afforded between turntable 75 and the driving wheel instead of resorting to the provision of drum 77 for the required slippage. When firm positive drive of either of the turntables 75 or 76 is required, as in the "high speed forward" or "rewinding" operations, driving wheel 74 will be moved until contact is made between the solid section of tire 97 and the selected turntable. When this is accomplished the collar 99 is compressed between the tire and turntable in the manner shown in Fig. 28.

The apparatus is provided with a muting device, generally indicated at 215, which is mounted on platform 7 at one side of lever arm 25, as shown in Figs. 2 and 3. The muting device, which has breakable contact points 216, has an arm extension 217 from one contact point which is adapted to be engaged by arm 25 when the latter is moved along track 22 or 23 to break the contact and open the circuit. The device is normally grounded to the grid of one of the amplifier tubes, so that any noises of the machine will not be transmitted through the loud speaker during operation of the machine in the "neutral," "high speed forward" or "rewinding" positions. In the "listening" and "recording" positions breaking of the contact points 216 renders the amplifier tubes operative.

The apparatus is also provided with a measuring device (see Figs. 1, 2, 3 and 17), which indicates the amount of tape which has been fed from one reel to the other. This device comprises a pointer 220 mounted for rotation on the upper surface of the cartridge cover 150 and connected to a disc 221 below the cover. A pair of pressure pulleys 222 and 223 are mounted on a housing 224. Housing 224 is carried by platform 7 for swinging movement by biasing spring 225 to bring the pulleys 222 and 223 into pressure engagement with pulley 162 and disc 221 respectively. As the tape 160 passes around pulley 162 the pulley 222 which is rotated by pulley 162 rotates pulley 223 by a mechanism (not shown). Pulley 223 in turn rotates disc 221 to move the pointer 220. A suitable scale may be provided on the upper surface of the cartridge assembly by which the pointer 220 may register the amount of tape which has been fed from one reel to the other.

An indicator lamp 226 mounted at one side of the forward end of the apparatus, is energized when the electrical circuit is on. The lamp is positioned at the rear of a reflector 227 in the front wall of shell 9 and illuminates the reflector to indicate that the electrical circuit is on. A second lamp 228, mounted at the opposite side of the forward end of the apparatus, is connected to that portion of the electronic apparatus which is receptive to the voice and other audible sounds. The voice level or the degree of resonance of the sounds is registered through lamp 228 by the degree of illumination produced by said lamp. A reflector 229 in shell 9 affords observation of the illumination of lamp 228.

Figure 29:
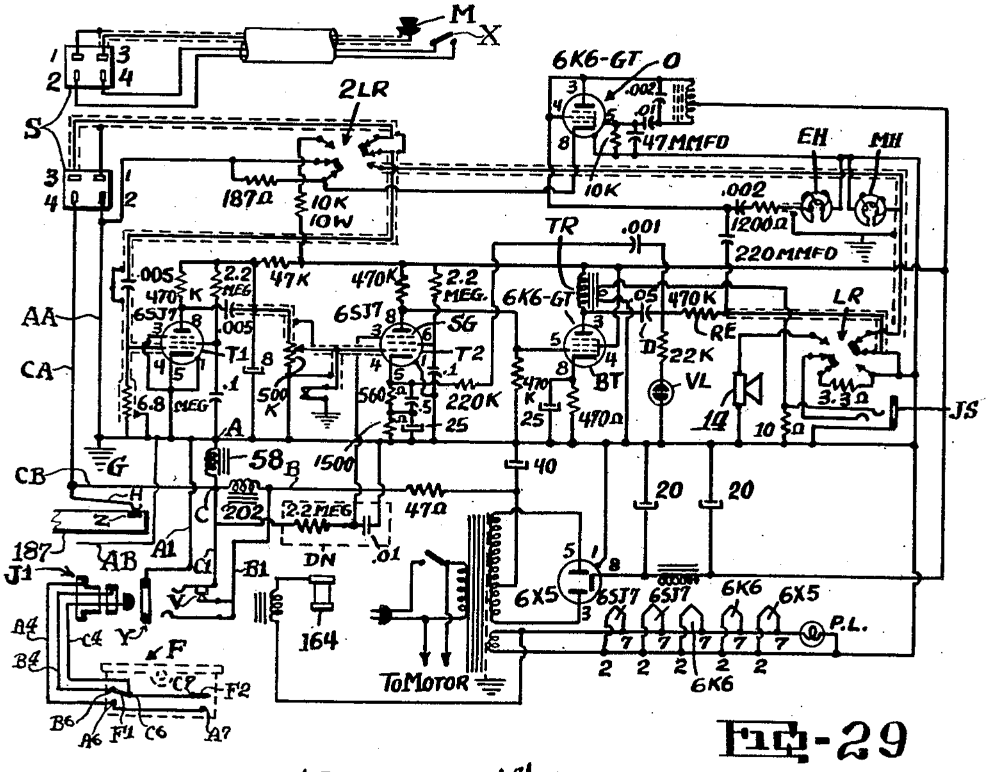
Fig. 29 is a wiring diagram illustrating a preferred embodiment of the amplifier system employed.

The amplifier system employed is illustrated in Fig. 29 which is a wiring diagram embodying my invention. The diagram shows a 3-stage resistance capacity coupled amplifier using two tetrode tubes T1 and T2 of the 6SJ7 type and a beam tetrode output tube BT of the 6K6 type. The latter has two output circuits; one energizes the loud speaker 14 via a transformer TR; the other feeds a magnetic head MH through a condenser D, a resistance RE and a section of a listen-record switch LR. The latter circuit includes a volume recording level indicator VL to show the correct recording level. A jack socket JS provides for an external loud speaker or for head phones.

The input is connected alternatively to two circuits, the one circuit including a microphone M, the other including the magnetic head MH. Selection is made by a section of a second listen-record switch 2 LR. This switch has two positions, listen and record. In the listen position the input of the amplifier is connected to the magnetic head MH and the output is connected to the loud speaker 14. In the record position the input is connected to the microphone while the output is connected to the magnetic head MH. In this latter position the magnetic head is also energized by a high frequency signal of constant frequency and amplitude for bias purposes. An oscillator O provides this bias signal and also energizes an erasing head EH to ensure that the tape is in demagnetized condition when it passes in front of the magnetic head.

The suppressor grid SG of the second tube T2 is taken to high tension negative through a delay network DN so that when the stop-start solenoid 58 and/or back-spacer solenoid 202, which are in series with the negative side of the power supply, are opened, the high negative voltage biases the aforesaid tube to cut-off, resulting in muting of the amplifier. The signal grid of tube T2 is taken to a muting switch 216 which is actuated by lever arm 25 in such a way as to ground this grid in all positions except listen and record.

Figure 30:
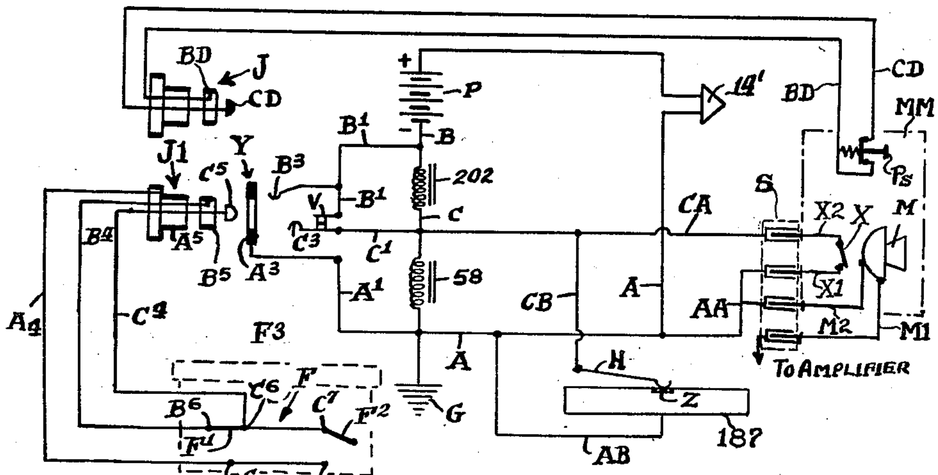
Fig. 30 is a wiring diagram showing details of the "stop-start" and "back-spacer" control according to one embodiment of the invention.

Fig. 30 illustrates that part of the diagram shown in Fig. 29 which pertains specifically to the "stop-start" for the capstan 42 and the "back-spacer" electrical controls. For convenience the source of power supply detailed in the diagram of Fig. 29 has been represented herein as indicated at P. This is connected on its positive side to the plates of the amplifier system which are represented by the symbol at 14', and on its negative side to "back-spacer" solenoid 202 through lead B and to "stop-start" solenoid 58 through lead C. The solenoids 202 and 58 are in series and are connected to the cathodes of amplifier 14' through lead A which is grounded at G.

The "back-spacer" solenoid 202 may be shorted out of the circuit by leads B1 and C1 connected to the ends of solenoid 202. Leads B1 and C1 are normally closed by switch V to de-energize the "back-spacer" solenoid 202. The "stop-start" solenoid 58 is normally energized to actuate the mechanism of lever 49 (see Fig. 5), which moves the lever out of driving engagement with the fly-wheel 34 and thereby renders the capstan 42 inoperable.

A microphone M is mounted on a microphone mount MM, indicated in broken lines. A pair of leads M1 and M2 are connected to Microphone M. "Stop-start" switch X is mounted on the microphone mount, and a pair of leads X1 and X2 are connected to the terminals of the switch X. Leads M1, M2, X1 and X2 are connected to the male members of a socket generally designated S. One of the female portions of the socket S associated with leads M1 and M2 of the microphone is connected to ground through lead AA and the other is connected to the input of the amplifier 14'. The other two female parts of socket S associated with leads X1 and X2 are connected to leads AA and CA, which leads are connected to the ends of "Stop-start" solenoid 58. The leads M1, M2, X1 and X2 are indicated by a single lead 184 in Fig. 1.

When switch X is open, solenoid 58 is energized to render the capstan inoperative, but when switch X is closed solenoid 58 will be short-circuited through leads AA, CA, X1, X2 and switch X to deenergize the solenoid and cause the capstan 42 to be rotated. As the movement of the "back-spacer" depends upon rotation of the capstan, the solenoid 58 must be deenergized whenever the "back-spacer" is to be operated. When switch X is closed the capstan is rotating, but when this switch is open the capstan is not rotated, so other means are provided to deenergize solenoid 58 when the "back-spacer" mechanism is operated.

Referring to Figs. 29 and 30, it will be seen that "back-spacer" disc 187 is grounded through a lead AB. A lead CB is connected to the upper end of solenoid 58, and to a brush H adapted to bear against disc 187. When brush H touches disc 187 the solenoid 58 will be deenergized to cause the capstan to rotate. An insulator Z is embedded in disc 187 and located at a point so that the connection between leads AB and CB will be opened when disc 187 has completed its back-spacing cycle. When "back-spacer" solenoid 202 is energized, cam arm 192 (Fig. 2) will rotate disc 187 sufficiently to move brush H into contact with the disc, thereby causing the capstan to rotate whether switch X is open or closed.

Fig. 30 also shows a modification not provided for in Fig. 29. This consists of a push button switch P*s* which is also mounted on the microphone mount and is normally closed under the compressive forces of a spring. The terminals of switch P*s* are connected by leads BD and CD to a jack plug J. The leads BD and CD are indicated at 185 in Fig. 1. When jack plug J is inserted in socket Y, the central part of plug J is adapted to make contact with lead C1 through terminal C3 and to open switch V, while an intermediate part of the jack makes contact with lead B1 through terminal B3. Thus when the jack is in operative position the switch P*s* is paralleled across "back-spacer" solenoid 202 and switch V is opened.

As long as switch P*s* remains closed, solenoid 202 is deenergized and thereby holds "back-spacer" disc 187 against rotation. However, when switch P*s* is opened, solenoid 202 will be energized and permit rotation of the "back-spacer" disc. After the disc is rotated through 180°, as previously explained, the disc is stopped by pawl 201 engaging pin 196 (Fig. 2). When P*s* is released it returns to closed position to deenergize solenoid 202 and permit the disc to return to its original position, where it remains until switch P*s* is again opened.

On completion of the back-spacing operation the apparatus is functioning at the "listening position" provided switch X is closed. If switch X is open, completion of the "back-spacer" disc cycle opens the circuit AA–CA, thus energizing the "stop-start" solenoid 58 and rendering the capstan 42 inoperative so that the tape 160 is not drawn past the head 146. When it is desired to resume recording or listening operation, "stop-start" switch X is closed to deenergize solenoid 58 and establish a drive between capstan 42 and fly-wheel 34.

From the preceding description it should be apparent that when the machine is used for recording an operator may cause the tape to be rewound by simply pressing switch P*s*, regardless of whether the machine is operating in a "listening," "high speed forward" or "recording" position. Or the tape may be stopped whenever the machine is operating in the "recording" or "listening" positions by closing switch X. The operator may also place the machine in any of the operating positions by simply moving lever 25 into an appropriate track. As an example of the high degree of control that can be had over the machine, when the machine is recording the recorded sounds may be played back by simply pressing switch P*s*, conveniently carried on the microphone, to rewind the tape until the appropriate point on the tape is reached and then releasing the switch to automatically move lever 25 into the "listening" position.

When the apparatus is used for transcribing, a foot pedal control mechanism, generally indicated at F (see Figs. 29, 30 and 31), is substituted for the control mechanism carried by the microphone mounting MM so that the hands of an operator may be free to type or for any other purposes. The foot pedal control mechanism is equipped with two switches F1 and F2 corresponding substandially to the switches P*s* and X in that they control the "back-spacer" and "stop-start" solenoids 202 and 58 respectively. Switch F1, which is pivotally connected to pole C6 of lead C4, selectively contacts poles B6 and A6 of leads B4 and A4 but is normally biased to close the circuit between poles C6 and B6. The switch F2 is pivotally connected to pole C7 of lead C4 and is adapted to contact pole A7 of lead A4. Switch F2 is normally biased to open position.

Figures 31, 32, 33:
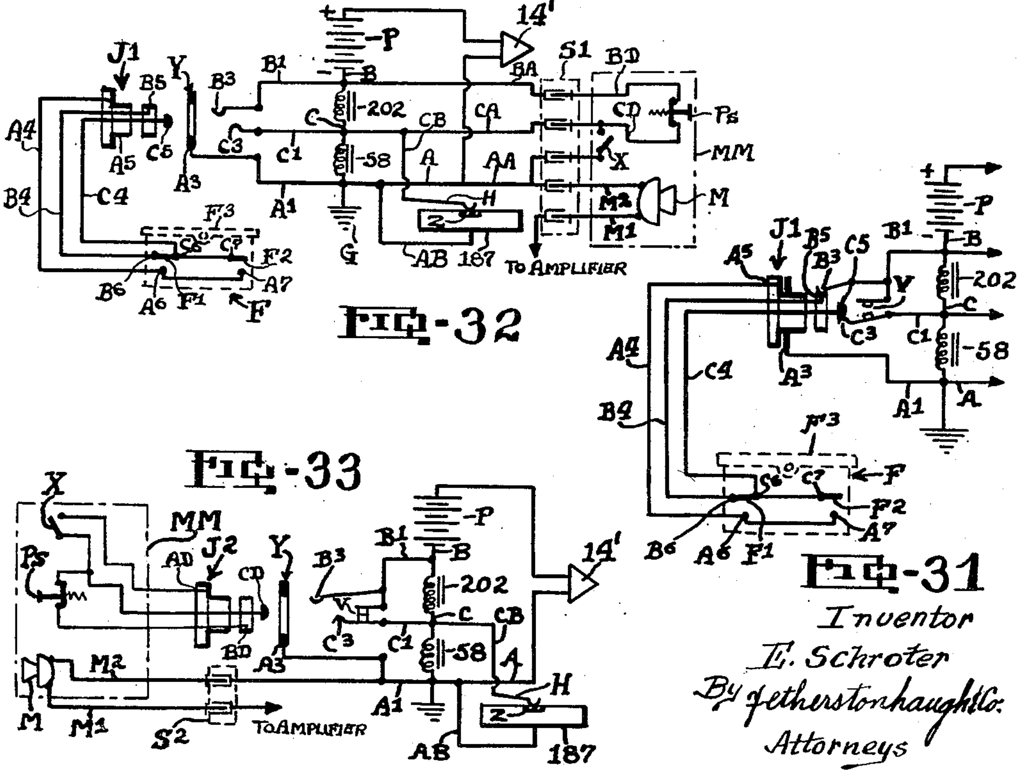
Fig. 31 is a partial wiring diagram according to Fig. 30 showing the foot control jack plugged into the socket therefor.
Fig. 32 is a wiring diagram showing details of a modified "stop-start" and "back-spacer" control.
Fig. 33 is a wiring diagram showing details of a further modified "stop-start" and "back-spacer" control.

Leads A4, B4 and C4 are respectively connected to outer, intermediate and inner central terminals A5, B5 and C5 of a jack plug J1, which make contact with terminals A3, B3 and C3 and open switch V, when plug J1 is inserted in socket Y in substitution for plug J of the microphone control (see Fig. 31). The essential difference between plugs J and J1 is that the former is adapted for control of the "back-spacer" solenoid 202 only, whereas the latter is adapted for control of the "back-spacer" and "stop-start" solenoids 202 and 58.

The foot pedal mechanism F has a tiltable plate F3 which is adapted to be rocked about a central horizontal axis. When plate F3 is tilted to one side the normally open switch F2 is compressed against its biasing to contact pole A7, short-circuiting the solenoid 58 through leads A4, A1 and C4, C1, to deenergize the solenoid and cause the capstan 42 to be rotated. Assuming that the apparatus has been set in the "listening" position, the operator can then play back the recording on the tape as long as the above tilting pressure is maintained on plate F3. If the operator desires to listen through head phones, a head phone cable 230 having a suitable terminal is plugged into the jack socket JS (see Figs. 1 and 29) which by-passes the loud speaker circuit.

To back-space, plate F3 is tilted in the opposite direction to open the circuit which through leads B4, B1, C4, C1 and switch F1, normally deenergize solenoid 202. This opening of the last mentioned circuit permits the solenoid to be energized, which, in turn, permits rotation of the "back-spacer" disc 187 through 180° in the manner above described. Release of tilting pressure on plate F3 causes the apparatus to be returned to the position of "listening." The operator then tilts the foot pedal plate F3 in the direction first described, to commence operation of the apparatus in the "listening" position.

Fig. 32 shows another modification of the electrical control system for the "back-spacer" and "stop-start" mechanisms. In this arrangement, the microphone and the controls on the microphone mounting are connected to the apparatus through a single multiple-outlet socket S1. Thus the leads from the microphone M, switch X and switch Ps are carried by a single conduit to a single multiple-pronged plug which is connected to the socket S1. With this arrangement the switch V is eliminated. The socket Y serves to receive the jack plug J1 of the foot pedal control F which is operable when the microphone assembly is disconnected from socket S1.

Fig. 33 shows a further modification of the "back-spacer" and "stop-start" electrical controls. Here the microphone leads are connected to a 2-outlet socket S2, while the "stop-start" and "back-spacer" switches X and Ps carried by the microphone mounting have their leads terminating in a 3-point contact jack plug J2 similar to that of the foot pedal jack plug J1. The jack plugs J2 and J1 are separately receivable in socket Y for selective operation of the "back-spacer" and/or "stop-start" solenoids through the microphone and foot pedal controls.

Having thus particularly described and ascertained the nature of my said invention and in what manner the same is to be performed, I declare that what I claim is:

1. In a magnetic recording apparatus having winding and re-winding turntables adapted to receive for rotation the reels of a recording tape which is fed from one reel to the other, means mounting said turntables in a common horizontal plane for rotation about parallel axes including a drum rotatable about the axis of rotation of said winding turntable and in slippable frictional contact with said winding turntable, a motor driven friction driving wheel mounted for rotation intermediate said winding and rewinding turntables and means mounting said driving wheel to swing the latter about a separate pivotal axis to selectively move said driving wheel into and out of resilient frictional rotary engagement with said drum, said winding turntable and said rewinding turntable.

2. Apparatus as set forth in claim 1, in which said driving wheel mounting means is operable for swinging movement of said driving wheel to rotate said drum for indirect rotation of said winding turntable.

3. Apparatus as set forth in claim 1, in which said driving wheel mounting means is operable for swinging movement of said driving wheel into direct frictional rotary engagement with said axially aligned drum and winding turntable.

4. Apparatus as set forth in claim 1, in which said friction driving wheel is provided with a relatively solid peripheral edge portion of substantial width having a resiliently flexible skirt at one side, said skirt having a marginal projection of greater diameter and of greater resiliency than said relatively solid peripheral edge for resilient frictional engagement with said drum when said driving wheel is moved toward the drum, whereby said drum imparts rotary movement to said winding turntable through the said resilient frictional contact therebetween, and said solid peripheral edge portion being engageable with said winding turntable upon distortion of said skirt in contact with said drum for direct drive of said winding turntable when the driving wheel is moved into firmer engagement with said drum.

5. Apparatus as set forth in claim 1, in which said means for swinging said friction driving wheel comprises a lever mounted to rotate about a pivotal axis and to support said friction driving wheel, an actuating arm having one end pivoted about an axis common with the axis of said lever, said actuating arm being resiliently engageable with said lever to rotate said lever about its pivotal axis for said swinging movement of said driving wheel upon rotation of said arm, a cam bar mounted adjacent said actuating arm and slidable relative to said actuating arm, said cam bar being provided with a cam slot shaped to provide a plurality of staggered parallel paths extending longitudinally of said bar, said parallel paths being successively connected by inclined paths, a post carried by said actuating arm adjacent its free end and receivable in said cam slot, and means actuating said bar for selective movement in opposite directions to shift said post from one parallel path to another to rotate said arm and lever so that movement of said bar in one direction shifts said post from one path to a succeeding path for swinging said driving wheel into driving engagement with said drum and continued movement in the same direction shifts said post to a further succeeding path for continued swinging of said driving wheel into driving engagement with said winding turntable.

6. Apparatus as set forth in claim 5, in which said actuating arm is mounted over said lever, a transverse slot is formed in said actuating arm, a pin is carried by said lever and receivable in said transverse slot, a pair of resilient pressure springs are secured at their adjacent ends to said actuating arm and have their free ends extending unidirectionally and disposed on either side of said pin in resilient pressure engagement therewith, and means are carried by said actuating arm intermediate and adjacent the free ends of said springs to overcome the biasing pressure of one of said springs on said pin during rotation of said actuating arm against the biasing pressure of the other of said springs on said pin to thereby increase the biasing force of said last mentioned spring on said pin.

7. In magnetic recording apparatus having a pair of winding and re-winding turntables adapted to receive for rotation therewith the reels of a magnetic recording tape which is fed from one reel to the other past a magnetic recording field, means operable for selectively rotating said turntables, a capstan rotatable about a fixed axis and operable for feeding a tape past said field at a controlled rate of speed, and having actuating means for driving said capstan including a power driven fly-wheel rotatable relative to said capstan about a common axis, the combination therewith of an arm pivoted to said capstan for swinging movement into and out of engagement with said fly-wheel for rotation of said capstan at a rate of speed governed by said fly-wheel, and actuating means for selective movement of said arm into and out of driving engagement with said fly-wheel.

8. Apparatus as set forth in claim 7, in which said fly-wheel is suspended for rotation about a vertical sleeve and is provided with depending lugs, and said capstan is provided with a spindle extension projecting through said sleeve in axial alignment therewith, a bar secured to said spindle below said sleeve to which said fly-wheel engaging arm is pivoted intermediate its length for rotation about a horizontal axis, one end of said arm being movable into and out of engagement with said fly-wheel lugs in response to rotation of said arm about its horizontal pivotal axis, and said arm actuating means comprises a plate disposed at right angles to said spindle and movable relative to said spindle along the axis thereof, said plate being connected to the free end of said arm for movement of said arm about its horizontal pivotal axis in response to movement of said plate along the axis of said spindle.

9. In a magnetic recording apparatus, the combination of a pair of winding and re-winding turntables adapted to receive for rotation therewith the reels of a magnetic recording tape which is fed from one reel to the other, a motor driven driving wheel mounted between said turntables, means mounting said driving wheel for swinging movement of said wheel about a pivotal axis to selectively engage said turntables for rotation of same, an actuating bar slidable relative to said swinging driving wheel mounting means and engageable with same to impart swinging movement thereto in response to sliding movement of said bar, a lever arm rotatable about a pivotal axis, said lever arm having one end connected to said actuating bar to translate sliding movement to said bar in response to rotary movement of said lever arm about its pivotal axis, and a "back-spacer" mechanism connected with said driving wheel and including an element movable in one direction to swing said driving wheel into driving engagement with said re-winding turntable whereby a predetermined section of the tape may be shifted in reverse direction, means to operate said "back-spacer" mechanism and move said element in said one direction, and means to move said element and counter-swing said driving wheel to move said driving wheel into driving engagement with said winding turntable when said means to operate said "back-spacer" mechanism is rendered inoperative.

10. In recording apparatus having a recording tape carried by reels, a rotatable driving wheel, a rotatable turntable for supporting a reel, a drum mounted for rotation and in frictional contact with said turntable, said drum being mounted coaxially with said turntable and disposed therebelow, and means to move said wheel into contact with said drum to drive said turntable through said drum and to further move said wheel into contact with said turntable to directly drive the turntable.

11. In recording apparatus having a recording tape, a rotatable turntable, a rotatable drum disposed adjacent said turntable, friction engaging means between said drum and turntable, a driving wheel, means to move said wheel into contact with said drum and turntable, a movable control member to operate said means to move said wheel, means to limit the extent of movement of said control member in one position to move said wheel into contact with said drum to drive said turntable through said frictional engaging means, and in another position to permit said control member to move said wheel into contact with said turntable to directly drive the turntable.

12. In recording apparatus having a tape fed past a recording head, a rotatable winding turntable, a rotatable rewinding turntable, a rotatable drum disposed adjacent said winding turntable, a driving wheel, means mounting said wheel for swinging movement into contact with said drum and turntables, a control member adapted to swing said wheel, a rotatable capstan, a pulley for compressing the tape against said capstan to thereby drive the tape, and means operated by said member to move said pulley against said tape and capstan, said member being moved to one position to swing said wheel into contact with said drum to drive said winding turntable and to move said pulley against said capstan to drive the tape, and being moved to another position to swing said wheel into contact with said winding turntable to thereby directly drive the tape.

13. In recording apparatus having recording tape, a winding turntable for the tape, a rewinding turntable, a driving wheel, an arm connected with said wheel and adapted to move selectively said wheel into and out of driving contact with said turntables to thereby wind or unwind the tape, a rotating member, a disc, means for rotating said disc from said member, and means on said disc to move said arm to engage said driving wheel with one of said turntables when said disc is rotated.

14. In recording apparatus having recording tape, a rewinding turntable, a driving wheel, an arm connected with said wheel and adapted to move said wheel into and out of contact with said turntable, a power driven rotating member, a disc, a cam surface on said arm, means for rotating said disc from said power driven member, and means carried by said disc to cooperate with said cam surface whereby said disc is initially rotated to move said wheel into contact with said rewinding turntable and then further rotated to move said wheel out of contact with said rewinding turntable.

15. In recording apparatus having recording tape, a rewinding turntable, a driving wheel, an arm connected with said wheel and adapted to move said wheel into and out of contact with said turntable, a power driven rotating member, a disc, means for rotating said disc from said power driven member, means on said disc to move said arm when said disc is rotated, and a releasable stop member adapted to engage said disc and hold it against rotation.

16. In recording apparatus having recording tape, a rewinding turntable, a driving wheel, an arm connected with said wheel and adapted to move said wheel into and out of contact with said turntable, a rotating member, a disc, means for rotating said disc from said member, means on said disc to move said arm when said disc is rotated, a releasable stop member adapted to engage said disc and hold it against rotation, a solenoid for operating said stop member, and a switch for actuating said solenoid, said switch being moved to one position to release said stop member and initiate rotation of said disc to move said wheel into contact with said rewinding turntable, and moved to another position to release said disc for further rotation to move said wheel out of contact with said rewinding turntable.

17. In recording apparatus having a recording tape, a winding turntable, a rewinding turntable, a driving wheel, a member for selectively moving said wheel into contact with said turntables, driven means for moving said member, and means automatically releasing said driven means after a predetermined movement thereof.

18. In recording apparatus having a recording tape, a winding turntable, a rewinding turntable, a driving wheel, a member for selectively moving said wheel into contact with said turntables, power means for moving said member, means for rendering said power means ineffective after a predetermined movement of said member, and a cam and follower connection between said power means and member initially effective to move said wheel into contact with said rewinding turntable and subsequently effective to move said wheel into contact with said winding turntable.

19. In recording apparatus having a recording tape, a winding turntable, a rewinding turntable, a driving wheel, manually operable means for selectively moving said wheel into contact with said turntables, and independently operable means for moving said wheel into contact with said turntables, said last-mentioned means comprising a movable member, a connecting means between said movable member and wheel, and means for driving said movable member.

20. In recording apparatus having a recording tape, a winding turntable, a rewinding turntable, a driving wheel, manually operable means for selectively moving said wheel into contact with said turntables and independently operable means for moving said wheel into contact with said turntables, said last-mentioned means comprising a disc, means to rotate said disc, a stop member to hold said disc against rotation, a solenoid to release said stop member, and means connecting said disc to said wheel, said solenoid being energized to momentarily release said stop member and permit said disc to rotate a predetermined amount to move said wheel into contact with said rewinding turntable and deenergized to release said stop member and permit said disc to return to its initial position and move said wheel into contact with said winding turntable.

21. In a magnetic recording apparatus, the combination of a pair of winding and re-winding turntables adapted to receive for rotation therewith the reels of a magnetic recording tape which is fed from one reel to the other, a motor-driven driving wheel mounted between said turntables, means mounting said driving wheel for swinging movement of said wheel about a pivotal axis to selectively engage said turntables for rotation of same, an actuating bar slidable relative to said swinging driving wheel mounting means and engageable with same to impart swinging movement thereto in response to sliding movement of said bar, a lever arm rotatable about a pivotal axis, said lever arm having one end connected to said actuating bar to translate sliding movement to said bar in response to rotary movement of said lever arm about its pivotal axis, and a "back-spacer" mechanism, operatively connected with said driving wheel to swing said driving wheel into driving engagement with said re-winding turntable whereby a predetermined section of the tape may be shifted in reverse direction, said "back-spacer" mechanism being further movable to counter-swing said driving wheel to move said driving wheel into driving engagement with said winding turntable, said "back-spacer" mechanism comprising a rotatable disc, an off-centre post carried by said disc to rotate therewith about the axis of said disc, an extension member operatively connected with said bar and being provided adjacent its free end with a cam surface against which said rotating offcentre post bears to slide said bar and rotate and counter-rotate said lever in response to rotary movement of said disc, and actuating means for imparting rotary movement to said disc.

22. In a magnetic recording apparatus, the combination of a pair of winding and re-winding turntables adapted to receive for rotation therewith the reels of a magnetic recording tape which is fed from one reel to the other, a motor-driven driving wheel mounted between said turntables, means mounting said driving wheel for swinging movement of said wheel about a pivotal axis to selectively engage said turntables for rotation of same, an actuating bar slidable relative to said swinging driving wheel mounting means and engageable with same to impart swinging movement thereto in response to sliding movement of said bar, a lever arm rotatable about a pivotal axis, said lever arm having one end connected to said actuating bar to translate sliding movement to said bar in response to rotary movement of said lever arm about its pivotal axis, and a "back-spacer" mechanism, operatively connected with said driving wheel to swing said driving wheel into driving engagement with said re-winding turntable whereby a predetermined section of the tape may be shifted in reverse direction, said "back-spacer" mechanism being further movable to counter-swing said driving wheel to move said driving wheel into driving engagement with said winding turntable, said "back-spacer" mechanism comprising a rotatable disc, an off-centre post carried by said disc to rotate therewith about the axis of said disc, an extension member operatively connected with said bar and being provided adjacent its free end with a cam surface against which said rotating offcentre post bears to slide said bar and rotate and counter-rotate said lever in response to rotary movement of said disc, and actuating means for imparting rotary movement to said disc, said actuating means including a driven rotary member engageable with the outer periphery of said disc to rotate said disc, said disc having its peripheral edge recessed at spaced intervals to interrupt engagement with said driven rotary member, a cam projecting from one surface of said disc, a biasing member disposed to engage said cam to impart rotary movement to said disc when the latter is out of engagement with said driven rotary member to move said disc into engagement with the driven member, and means normally biased to engage said disc to retain the latter against movement by the said cam biasing member, said last-mentioned means being movable against the biasing of same to release the disc for rotary movement by said driven rotary member between successive recesses of the disc.

References Cited in the file of this patent

UNITED STATES PATENTS

| | | |
|---|---|---|
| 2,504,587 | Rey | Apr. 18, 1950 |
| 2,536,666 | Somers | Jan. 2, 1951 |
| 2,555,643 | Harrison | June 5, 1951 |
| 2,589,660 | Bauman et al. | Mar. 18, 1952 |
| 2,617,890 | Barany | Nov. 11, 1952 |
| 2,645,495 | Nelson | July 14, 1953 |
| 2,668,674 | Roberts | Feb. 9, 1954 |